United States Patent

Denzel et al.

3,891,660
June 24, 1975

[54] DERIVATIVES OF 1H-IMIDAZO[4,5-C]PYRIDINE-7-CARBOXYLIC ACIDS AND ESTERS

[75] Inventors: Theodor Denzel, Regensburg; Hans Hoehn, Tegernheim, both of Germany

[73] Assignee: E. R. Squibb & Sons, Inc., Princeton, N.J.

[22] Filed: Feb. 7, 1974

[21] Appl. No.: 440,620

[52] U.S. Cl....... 260/295.5 B; 424/266; 260/240 G; 260/295.5 R
[51] Int. Cl.............................................. C07d 39/00
[58] Field of Search...... 260/240 G, 295.5 B, 296 A

[56] References Cited
UNITED STATES PATENTS

| | | | |
|---|---|---|---|
| 3,773,777 | 11/1973 | Hoehn et al. | 260/295.5 B |
| 3,833,598 | 9/1974 | Denzel et al. | 260/295 F |
| 3,849,411 | 11/1974 | Hoehn et al. | 260/240 G |

OTHER PUBLICATIONS
Chemical Abstracts, Vol. 44, Cols. 5361 to 5362 (1950).
Chemical Abstracts, Vol. 44, Col. 7353 (1950), (abst. of British Patent 629,441).
Matsushima et al, Chem. Pharm. Bull., 1968, Vol. 16, pp. 2277 to 2282.
Chemical Abstracts, Vol. 72, Abst. No. 12687 (1970) (abst. of De Roo et al.)
Chemical Abstracts, Vol. 78, Abst. No. 83672 e (April 1973).

*Primary Examiner*—John D. Randolph
*Attorney, Agent, or Firm*—Lawrence S. Levinson; Merle J. Smith; Stephen B. Davis

[57] ABSTRACT

New derivatives of 1H-imidazo[4,5-c]pyridine-7-carboxylic acids and esters and their acid addition salts having the general formula

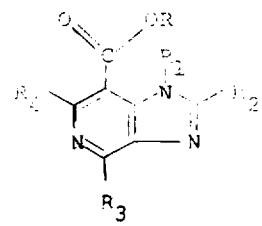

are disclosed. They are useful as anti-inflammatory agents and central nervous system depressants. In addition, this type of compound increases the intracellular concentration of adenosine-3',5'-cyclic monophosphate.

15 Claims, No Drawings

DERIVATIVES OF 1H-IMIDAZO(4,5-C)PYRIDINE-7-CARBOXYLIC ACIDS AND ESTERS

SUMMARY OF THE INVENTION

This invention relates to new derivatives of 1H-imidazo[4,5-c]pyridine-7-carboxylic acids and esters and acid addition salts thereof having the general formula

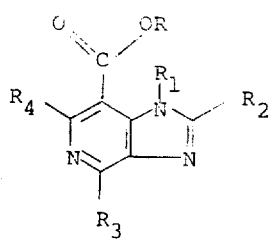

The symbols have the following meaning in formula I and throughout this specification.

R is hydrogen or lower alkyl.

$R_1$ is hydrogen, lower alkyl, phenyl, phenyl-lower alkyl, or substituted phenyl and phenyl-lower alkyl.

$R_2$ is hydrogen, lower alkyl, phenyl, or lower alkyl-phenyl.

$R_3$ is lower alkoxy, an acyclic basic nitrogen group

wherein $R_5$ and $R_6$ are hydrogen or lower alkyl, a hydrazine

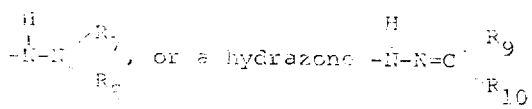

wherein $R_7$, $R_8$, and $R_9$ are each independently selected from hydrogen, lower alkyl, and phenyl, and $R_{10}$ is lower alkyl or phenyl.

$R_4$ is hydrogen, lower alkyl, or phenyl.

The lower alkyl group referred to throughout this specification include straight or branched chain hydrocarbon groups containing 1 to 7 carbon atoms, preferably 1 to 4 carbons. Examples of the type of groups contemplated are methyl, ethyl, propyl, isopropyl, etc. The lower alkoxy groups include such lower alkyl groups bonded to an oxygen, e.g., methoxy, ethoxy, propoxy, isopropoxy, etc. The phenyl-lower alkyl groups include such lower alkyl groups bonded to a phenyl, e.g., benzyl, phenethyl, etc.

The substituted phenyl groups include one or two simple substituents, i.e., lower alkyl, lower alkoxy, halogen (F, Cl, Br, or I, preferably Cl or Br), $CF_3$, amino or carboxy. Examples of the type of groups contemplated are o-, m-, or p-chlorophenyl, o-, m- or p-tolyl, 2,5-dichlorophenyl, 3,5-dimethylphenyl, 3,4-dimethoxyphenyl, o-, m- or p-chlorobenzyl, 3,5-dichlorophenethyl, etc.

Preferred embodiments of this invention are as follows:

R is hydrogen or lower alkyl of 1 to 4 carbons, especially ethyl.

$R_1$ is hydrogen or lower alkyl of 1 to 4 carbons, especially ethyl or butyl.

$R_2$ is hydrogen or lower alkyl of 1 to 4 carbons, especially hydrogen or methyl.

$R_3$ is lower alkoxy of 1 to 4 carbons, especially ethoxy, amino, lower alkylamino of 1 to 4 carbons, especially ethyl or butylamino,

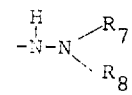

where $R_7$ is hydrogen and $R_8$ is hydrogen or lower alkyl of 1 to 4 carbons, especially where both $R_7$ and $R_8$ are hydrogen, or

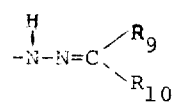

where $R_9$ and $R_{10}$ are both lower alkyl of 1 to 4 carbons, especially where $R_9$ and $R_{10}$ are both methyl.

$R_4$ is hydrogen or lower alkyl of 1 to 4 carbons, especially methyl.

DETAILED DESCRIPTION

The new compounds of formula I are formed by the following series of reactions. The symbols in the structural formulas have the same meaning as previously described.

A 4,6-dihydroxypyridine carboxylic acid ester of the formula (II) 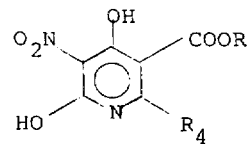

(produced analogs to the procedure described in Chem. Ber. 99, 244, (1966)), is reacted with an inorganic acid chloride such as phosphorous oxychloride, producing a compound of formula (III) 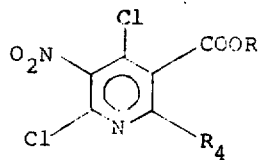

with chlorine atoms in the 2 and 4 position of the molecule.

This compound is now treated in a solvent such as alcohol with the appropriate amine of the formula (IV) $H_2N-R_1$ at about 80°C in the presence of a base such as triethylamine. By this reaction a product of formula (V) 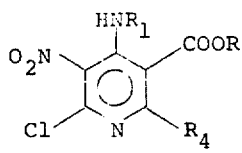

is obtained.

Treatment of compounds of formula V with appropriate amines of formula (VI) 

in the presence of a base such as triethylamine produces a compound of formula (VII) 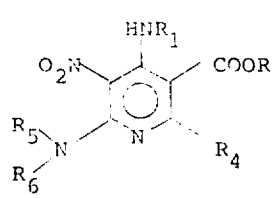

which is now hydrogenated catalytically with a catalyst such as palladium or nickel or by a reduction with a metal-acid pair such as zinc in acetic acid, iron in hydrochloric acid or the like, producing a tri-amino compound of formula (VIII) 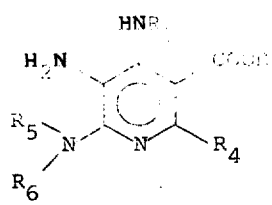

Compounds of formula (Ia) 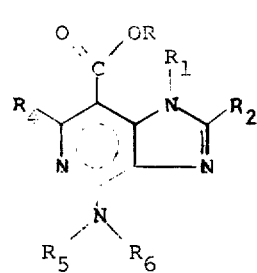

with an amino group are now obtained by reaction of compounds of formula VIII with an ortho carboxylic acid ester of the formula (IX) 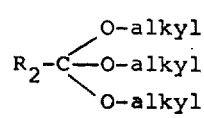

or with a carboxylic acid of formula (X) R$_2$—COOH

Compounds of formula (Ib) 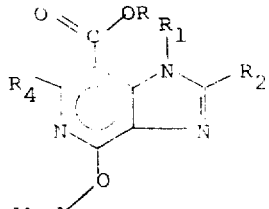

with an alkoxy group are now produced by reacting compounds of formula V with an alkali metal alcoholate. By this procedure a compound of formula (XI) 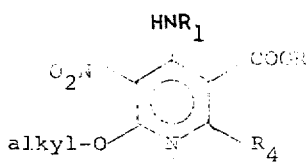

is produced with an alkoxy group in the 6-position of the molecule.

This compound is processed as described above, e.g., reduction of the nitro group either catalytically or with a metal-acid pair such as zinc in acetic acid. This results in formation of compounds of formula (XII) 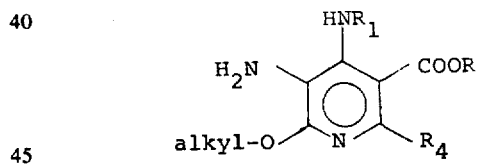

which are now treated with ortho carboxylic acid ester or carboxylic acid of formulas IX or X to give products of formula Ib.

Compounds of formula Ia are alternatively produced by a reaction of compounds of formula Ib with an appropriate amine of formula VI.

Compounds of formula (Ic) 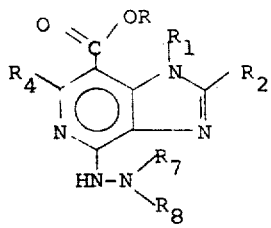

with a hydrazino group, are formed by reaction of compounds of formula Ib with the corresponding hydrazine of the formula (XIII) 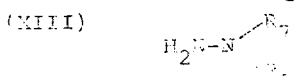

Compounds of formula (Ic)

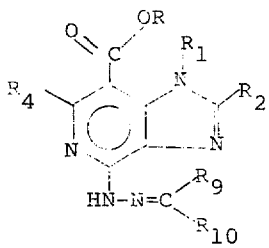

with a hydrazone group are obtained by reaction of compounds of formula Ic with aldehydes or ketones of formula (XIV) 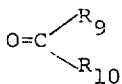

The bases of formula I form pharmaceutically acceptable acid addition salts by reaction with equivalent amounts of the common inorganic and organic acids. Such salts include the hydrohalides, e.g., hydrobromide, hydrochloride, sulfate, nitrate, phosphate, acetate, citrate oxalate, tartrate, malate, succinate, benzoate, ascorbate, alkanesulfonate, e.g., methanesulfonate, arylsulfonate, e.g., benzenesulfonate, etc. It is frequently convenient to purify or isolate the product by forming an insoluble salt. The base may be obtained by neutralization and another salt then formed by treatment with the appropriate acid.

The new compounds of this invention and their acid addition salts have anti-inflammatory properties and are useful as anti-inflammatory agents, for example, to reduce local inflammatory conditions such as those of an edematous nature or resulting from proliferation of connective tissue in various mammalian species such as rats, dogs and the like when given orally in dosages of about 5 to 50 mg/kg/day, preferably 5 to 25 mg/kg/day, in single or 2 to 4 divided doses, as indicated by the carageenan edema assay in rats. The active substance may be utilized in compositions such as tablets, capsules, solutions or suspensions containing up to about 300 mg. per unit of dosage of a compound or mixture of compounds of formula I. They may be compounded in conventional manner with a physiologically acceptable vehicle or carrier, excipient, binder, preservative, stabilizer, flavor, etc. as called for by accepted pharmaceutical practice. Topical preparations containing about 0.01 to 3 percent by weight of active substance in a lotion, salve or cream may also be used.

The new compounds of this invention and their acid addition salts also have central nervous system depressant activity and can be used as tranquilizers or ataractic agents for the relief of anxiety and tension states, for example, in mice, cats, rats, dogs and other mammalian species, in the same manner as chlordiazepoxide. For this purpose a compound or mixture of compounds of formula I or formula II or their acid addition salts is administered orally or parenterally in a conventional dosage form such as tablet, capsule, injectable or the like. A single does, or preferably 2 to 4 divided daily doses, provided on a basis of about 1 to 50 mg. per kilogram per day, preferably about 2 to 15 mg. per kilogram per day is appropriate. These may be conventionally formulated in an oral or parenteral dosage form by compounding about 10 to 250 mg. per unit dosage with conventional vehicle, excipient, binder, preservative, stabilizer, flavor or the like as called for by accepted pharmaceutical practice.

The new compounds and their acid addition salts also increase the intracellular concentration of adenosine-3',5'-cyclic monophosphate, and thus by the administration of about 1 to 100 mg. per kilogram per day, preferably about 10 to 50 mg. per kilogram, in single or 2 to 4 divided doses in conventional oral or parenteral dosage forms such as those described above may be used to alleviate the symptoms of asthma.

The following examples are illustrative of the invention. All temperatures are on the centigrade scale.

EXAMPLE 1

4-Amino-1-butyl-6-methyl-1H-imidazo[4,5-c]pyridine-7-carboxylic acid ethyl ester.

a. 4,6-Dichloro-2-methyl-5-nitro-pyridine-3-carboxylic acid ethyl ester 242 g. of 4,6-dihydroxy-2-methyl-5-nitro-pyridine-3-carboxylic acid ethyl ester (1 Mol.) are heated at 120° with 500 ml. phosphorous oxychloride for 3 hours. After this time, the excess phosphorous oxychloride is removed in vacuo and the black residue decomposed by pouring into ice-water. About 1 liter of chloroform is added and the mixture is filtered to remove undissolved material. The organic layer is separated and the aqueous phase extracted twice with 100 ml. portions of chloroform. The extract is dried over calcium chloride, filtered and evaporated to dryness. The resulting oil is crystallized with about 500 ml. benzene, yielding 153 g. of 4,6-dichloro-2-methyl-5-nitro-pyridine-3-carboxylic acid ethyl ester (55%); m.p. 45°–46°.

b. 4-Butylamino-6-chloro-2-methyl-5-nitro-pyridine-3-carboxylic acid ethyl ester 139.5 g. of the 4,6-dichloro-2-methyl-5-nitro-pyridine-3-carboxylic acid ethyl ester (0.5 Mol.) are dissolved in about 500 ml. methanol. 60 g. of triethylamine are added and the solution is heated at reflux temperature. At this point, 36.5 g. of n-butylamine are added dropwise. This process should be completed in about 2 hours. The solvent is then removed in vacuo and 500 ml. benzene are added to the residue. The triethylamine hydrochloride is removed by filtration and the solvent evaporated. The resulting oil is dissolved in 300 ml. methanol and yields on cooling 110 g. 4-butylamino-6-chloro-2-methyl-5-nitro-pyridine-3-carboxylic acid ethyl ester (70%); m.p. 35°–36° (methanol).

c. 6-Amino-4-butylamino-2-methyl-5-nitro-pyridine-3-carboxylic acid ethyl ester 177.9 g. of 4-butylamino-6-chloro-2-methyl-5-nitro-pyridine-3-carboxylic acid ethyl ester (0.5 Mol.) and 500 ml. of ethanol are heated in an autoclave together with 300 ml. aqueous ammonia (30%) at about 60° for 10 hours. After this time, the solvent is distilled off and the residue of 6-amino-4-butylamino-2-methyl-5-nitropyridine-3-carboxylic acid ethyl ester recrystallized from methanol. Yield is 135 g. (91%); m.p. 98°–99°.

d. 5,6-Diamino-4-butylamino-2-methyl-pyridine-3-carboxylic acid ethyl ester 29.6 g. of 6-amino-4-butylamino-2-methyl-pyridine-3-carboxylic acid ethyl ester (0.1 Mol.) are dissolved in 150 ml. acetic acid. The solution is heated at reflux temperature. Zinc is added carefully until the solution is colorless (about 20 g.) and heating is continued for an additional 10 minutes. The mixture is evaporated to dryness and about 100 ml. of water are added. The solution is neutralized with dilute aqueous ammonia and extracted three times with 100 ml. portions of ether. The ether extracts are combined, dried with calcium chloride and the solvent evaporated. The oily residue of 5,6-diamino-4-butylamino-2-methyl-pyridine-3-carboxylic acid ethyl ester crystallizes with methanol. Yield is 21 g. (79%); m.p. 82°–83° (methanol/$H_2O$).

e. 4-Amino-1-butyl-6-methyl-1H-imidazo[4,5-c]pyridine-7-carboxylic acid ethyl ester.

26.6 g. of 5,6-diamino-4-butylamino-2-methyl-pyridine-3-carboxylic acid ethyl ester are refluxed in 100 ml. formic acid for 6 hours. After the excess of formic acid is removed in vacuo, 4-amino-1-butyl-6-methyl-1H-imidazo[4,5-c]pyridine-7-carboxylic acid ethyl ester crystallizes. Yield is 20.5 g. (74%); m.p. 133°–134°C (methanol).

EXAMPLE 2

1-Ethyl-4-(ethylamino)-6-methyl-1H-imidazo[4,5-c]pyridine-7-carboxylic acid ethyl ester.

a. 4,6-Di(ethylamino)-2-methyl-5-nitro-pyridine-3-carboxylic acid ethyl ester.

27.9 g. of 4,6-dichloro-2-methyl-5-nitro-pyridine-3-carboxylic acid ethyl ester (0.1 Mol.) of example 1a are dissolved in 200 ml. methanol. The solution is heated at reflux temperature and a solution of 22.5 g. ethylamine (0.5 Mol.) in 50 ml. methanol is added dropwise. After the addition is completed, the solvent is distilled off and the residue extracted with about 300 ml. benzene. The benzene is removed and the residue of 4,6-di-ethylamino-2-methyl-5-nitro-3-pyridine-carboxylic acid ethyl ester recrystallized from methanol. Yield is 22.5 g. (76%); m.p. 63°–65°.

b. 5-Amino-4,6-di-ethylamino-6-methyl-pyridine-3-carboxylic acid ethyl ester.

29.6 g. of 4,6-di-ethylamino-2-methyl-5-nitro-pyridine-3-carboxylic acid ethyl ester are dissolved in 100 ml. of butyl alcohol, 0.2 g. palladium on charcoal (10%) are added and the solution is hydrogenated in an autoclave at 60° and 10 atm. pressure. Filtration of the catalyst and evaporation of the solvent yields 26 g. of oily 5-amino-4,6-di-ethylamino-6-methyl-pyridine-3-carboxylic acid ethyl ester. (98%).

c. 1-Ethyl-4-(ethylamino)-6-methyl-1H-imidazo[4,5-c]pyridine-7-carboxylic acid ethyl ester.

26.6 g. of 5-Amino-4,6-di(ethylamino)-2-methyl-pyridine-3-carboxylic acid ethyl ester and 100 ml. of formic acid are refluxed for 5 hours. Evaporation of formic acid yields crystalline 1-ethyl-4-(ethylamino)-6-methyl-1H-imidazo-[4,5-c]pyridine-7-carboxylic acid ethyl ester. Yield is 18.2 g. (62%); m.p. 63°–65° (ligroin).

EXAMPLE 3

1-Butyl-4-(ethylamino)-6-methyl-1H-imidazo[4,5-c]pyridine-7-carboxylic acid ethyl ester.

a. 4-butylamino-6-ethylamino-12-methyl-5-nitro-pyridine-3-carboxylic acid ethyl ester.

When 4-butylamino-6-chloro-2-methyl-5-nitro-pyridine-3-carboxylic acid ethyl ester of example 1b is treated with ethylamine according to the procedure of example 1c, 4-butylamino-6-ethylamino-2-methyl-5-nitro-pyridine-3-carboxylic acid ethyl ester is obtained in an 83% yield; m.p. 53°–55°.

b. 5-Amino-4-butylamino-6-ethylamino-2-methyl-pyridine-3-carboxylic acid ethyl ester.

Hydrogenation of 4-butylamino-6-ethylamino-2-methyl-5-nitro-pyridine-3-carboxylic acid ethyl ester according to the procedure of example 1d results in formation of oily 5-amino-4-butylamino-6-ethylamino-2-methyl-pyridine-3-carboxylic acid ethyl ester. Yield is 94%.

c. 1-Butyl-4-(ethylamino)-6-methyl-1H-imidazo[4,5-c]pyridine-7-carboxylic acid ethyl ester.

25.4 g. of 5-Amino-4-butylamino-6-ethylamino-2-methylpyridine-3-carboxylic acid ethyl ester and 100 g. of ortho-formic acid ethyl ester are refluxed for 12 hours. The excess ortho ester is removed in vacuo and the oily residue distilled. B.p. 0.1 200°–215°. The fraction crystallizes on the addition of 50 ml. of a 1:1 mixture of petrolether/ether. 1-Butyl-4-(ethylamino)-6-methyl-1H-imidazo[4,5-c]pyridine-7-carboxylic acid ethyl ester is recrystallized from petrolether. Yield is 18 g. (59%); m.p. 46°–48°.

EXAMPLE 4

4-(Butylamino)-1-ethyl-2,6-dimethyl-1H-imidazo[4,5-c]pyridine-7-carboxylic acid ethyl ester.

a. 6-Chloro-4-ethylamino-2-methyl-5-nitro-pyridine-3-carboxylic acid ethyl ester.

When 4,6-dichloro-2-methyl-pyridine-3-carboxylic acid ethyl ester of example 1a is treated with ethylamine according to the procedure of example 1b, 6-chloro-4-ethylamino-2-methyl-5-nitro-pyridine-3-carboxylic acid ethyl ester is obtained. Yield is 69%; m.p. 36°–37° (methanol).

b. 6-Butylamino-4-ethylamino-2-methyl-5-nitro-pyridine-3-carboxylic acid ethyl ester.

Treatment of 6-chloro-4-ethylamino-2-methyl-5-nitropyridine-3-carboxylic acid ethyl ester with n-butylamine according to the procedure of example 1c, 6-butylamino-4-ethylamino-2-methyl-5-nitro-pyridine-3-carboxylic acid ethyl ester is formed. Yield is 88%; m.p. 40°–42° (methanol).

c. 5-Amino-6-butylamino-4-ethylamino-2-methyl-pyridine-3-carboxylic acid ethyl ester.

Hydrogenation of 6-butylamino-4-ethylamino-2-methyl-5-nitro-pyridine-3-carboxylic acid ethyl ester according to the procedure of example 2b yields 5-amino-6-butylamino-4-ethylamino-2-methyl-pyridine-3-carboxylic acid ethyl ester. Yield is 96%.

d. 4-(Butylamino)-1-ethyl-2,6-dimethyl-1H-imidazo[4,5-c]-pyridine-7-carboxylic acid ethyl ester.

When 5-Amino-4-butylamino-6-ethylamino-2-methylpyridine-3-carboxylic acid ethyl ester is treated with ortho acetic acid ethyl ester according to the procedure of example 3c, 4-(butylamino)-1-ethyl-2,6-dimethyl-1H-imidazo-[4,5-c]pyridine-7-carboxylic acid ethyl ester is obtained. Yield is 55%, B.p. 0.1 195°–215°; m.p. 44°–46°.

EXAMPLE 5

1-Ethyl-4-ethylamino-2,6-dimethyl-1H-imidazo[4,5-c]-pyridine-7-carboxylic acid ethyl ester.

When 5-Amino-4,6-di-ethylamino-6-methylpyridine-3-carboxylic acid ethyl ester of example 2b is treated with ortho acetic acid ethyl ester according to the procedure of example 3c, 1-ethyl-4-ethylamino-2,6-dimethyl-1H-imidazo-[4,5-c]pyridine-7-carboxylic acid ethyl ester is obtained. Yield is 58%; B.p. 190°–220° m.p. 36°–38° (petrolether/ether).

EXAMPLE 6

4-Butylamino-1-ethyl-6-methyl-1H-imidazo[4,5-c]pyridine-7-carboxylic acid ethyl ester.

5-Amino-6-butylamino-4-ethylamino-2-methyl-pyridine-3-carboxylic acid ethyl ester of example 4c is treated with formic acid according to the procedure of example 2c to give 4-butylamino-1-ethyl-6-methyl-1H-imidazo[4,5-c]pyridine-7-carboxylic acid ethyl ester. Yield is 55%; B.p. 190°–210°; m.p. 34°–36° (Petrolether/ether).

EXAMPLE 7

1-Ethyl-4-ethoxy-6-methyl-1H-imidazo[4,5-c]pyridine-7-carboxylic acid ethyl ester.

a. 4-Ethylamino-6-ethoxy-5-nitro-2-methyl-pyridine-3-carboxylic acid ethyl ester.

287 g. of 6-Chloro-4-ethylamino-5-nitro-6-methyl-pyridine-3-carboxylic acid ethyl ester (1 Mol.) of example 4a are slowly added to a gently refluxing mixture of 24 g. of sodium in 750 ml. of dry alcohol. The mixture is heated with stirring for an additional hour. After cooling to room temperature, the sodium chloride is filtered off and the filtrate evaporated to dryness. The oily residue of 4-ethylamino-6-ethoxy-5-nitro-2-methyl-pyridine-3-carboxylic acid ethyl ester is crystallized with methanol. Yield is 305 g. (82%); m.p. 40°–42° (methanol).

b. 5-Amino-4-ethylamino-6-ethoxy-2-methyl-pyridine-3-carboxylic acid ethyl ester.

166 g. of 4-Ethylamino-6-ethoxy-5-nitro-2-methyl-pyridine-3-carboxylic acid ethyl ester (0.5 Mol.) are dissolved in 600 ml. of butanol and hydrogenated according to the procedure described in example 2b. This yields 125 g. (90%) of oily 5-amino-4-ethylamino-6-ethoxy-2-methyl-pyridine-3-carboxylic acid ethyl ester.

c. 1-Ethyl-4-ethoxy-6-methyl-1H-imidazo[4,5-c]pyridine-7-carboxylic acid ethyl ester.

26.7 g. of 5-Amino-4-ethylamino-6-ethoxy-2-methylpyridine-3-carboxylic acid ethyl ester (0.1 Mol.) and 100 ml. of orthoformic acid ethyl ester are refluxed for 10 hours. The excess of orthoester is distilled off and the residue of 1-ethyl-4-ethoxy-6-methyl-1H-imidazo[4,5-c]pyridine-7-carboxylic acid ethyl ester is recrystallized from petrol ether. Yield is 18.2 g. (65%); m.p. 45°–46°.

EXAMPLE 8

1-Ethyl-6-methyl-4-[2-(1-methyl-ethylidene)hydrazino]-1H-imidazo[4,5-c]pyridine-7-carboxylic acid ethyl ester.

a. 1-Ethyl-4-hydrazino-6-methyl-1H-imidazo[4,5-c]pyridine-7-carboxylic acid ethyl ester.

2.8 g. of 1-Ethyl-4-ethoxy-6-methyl-1H-imidazo[4,5-c]-pyridine-7-carboxylic acid ethyl ester (0.01 Mol.) andn 1 g. of hydrazine hydrate are refluxed in about 1 ml. butyl alcohol for 10 hours. After this time, the mixture is evaporated to dryness and the remaining 1-ethyl-4-hydrazino-6-methyl-1H-imidazo[4,5-c]pyridine-7-carboxylic acid ethyl ester recrystallized from methanol. Yield is 1.9 g. (73%); m.p. 120°–122°.

b. 1-Ethyl-6-methyl-4-[2-(1-methyl-ethylidene)hydrazino]-1H-imidazo[4,5-c]pyridine-7-carboxylic acid ethyl ester.

2.6 g. of 1-Ethyl-4-hydrazino-6-methyl-1H-imidazo-[4,5-c]pyridine-7-carboxylic acid ethyl ester (0.01 Mol.) are dissolved in 10 ml. acetone. The mixture is allowed to stand overnight at room temperature. The excess of acetone is distilled off and the crystalline residue of 1-ethyl-6-methyl-4-[2-(1-methyl-ethylidene)hydrazino]-1H-imidazo[4,5-c]-pyridine-7-carboxylic acid ethyl ester recrystallizes from ethylacetate. Yield is 2.9 g. (95%); m.p. 151°–153°.

EXAMPLES 9–41

Following the procedure of example 1 but employing the appropriate 2-substituted-4,6-dihydroxypyridine carboxylic acid or ester of formula II and the appropriate amine of formula IV results in the production of various tri-amino compounds of formula VIII which when reacted with the appropriate ortho carboxylic acid ester of formula IX yields the products of formula Ia.

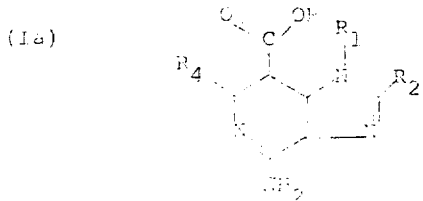

(Ia)

| Ex. | R | $R_1$ | $R_2$ | $R_4$ |
|---|---|---|---|---|
| 9 | H | H | $CH_3$ | $CH_3$ |
| 10 | $CH_3$ | H | H | ⟨C⟩ |

—Continued

| Ex. | R | R₁ | R₂ | R₄ |
|---|---|---|---|---|
| 11 | $C_3H_7$ | H | $C_2H_5$ | $CH_3$ |
| 12 | $C_4H_9$ | H | $C_2H_5$ | H |
| 13 | $C_2H_5$ | $C_2H_5$ | $CH_3$ | $C_4H_9$ |
| 14 | $C_2H_5$ | $C_3H_7$ | $CH_3$ | $CH_3$ |
| 15 | $C_2H_5$ | –C₆H₅ | H | $CH_3$ |
| 16 | $C_2H_5$ | –C₆H₄–CH₃ | $CH_3$ | $CH_3$ |
| 17 | $CH_3$ | –C₆H₄–C₂H₅ | H | $C_2H_5$ |
| 18 | $CH_3$ | –C₆H₄–C₃H₇ | H | $C_3H_7$ |
| 19 | $C_2H_5$ | –C₆H₄–OC₂H₅ | H | H |
| 20 | $C_2H_5$ | –C₆H₄–Br | $CH_3$ | H |
| 21 | $C_2H_5$ | –C₆H₃(Cl)(Cl) | $CH_3$ | $CH_3$ |
| 22 | $C_2H_5$ | –C₆H₄–CF₃ | $CH_3$ | $CH_3$ |
| 23 | $C_2H_5$ | –C₆H₄–COOH | $CH_3$ | $CH_3$ |
| 24 | $C_2H_5$ | –C₆H₄–NH₂ | H | $CH_3$ |
| 25 | $C_2H_5$ | –CH₂–C₆H₅ | H | $CH_3$ |
| 26 | $C_2H_5$ | –CH₂–CH₂–C₆H₅ | H | H |
| 27 | $C_2H_5$ | –CH₂–C₆H₄–CH₃ | H | $CH_3$ |
| 28 | $C_2H_5$ | –CH₂–C₆H₄–OC₂H₅ | H | $CH_3$ |

| Ex. | R | $R_1$ | $R_2$ | $R_4$ |
|---|---|---|---|---|
| 29 | $C_2H_5$ | $-CH_2-C_6H_4-F$ | H | $CH_3$ |
| 30 | $C_2H_5$ | $-CH_2-C_6H_4-CF_3$ | H | $CH_3$ |
| 31 | $C_2H_5$ | $-CH_2-C_6H_4-COOH$ | H | $CH_3$ |
| 32 | $C_2H_5$ | $-CH_2-CH_2-C_6H_4-C_2H_5$ | H | $CH_3$ |
| 33 | $C_2H_5$ | $-CH_2-CH_2-C_6H_4(Br)$ | H | $CH_3$ |
| 34 | $C_2H_5$ | $-CH_2-CH_2-C_6H_4(OCH_3)$ | H | $CH_3$ |
| 35 | $C_2H_5$ | $-CH_2-CH_2-C_6H_4-NH_2$ | H | $CH_3$ |
| 36 | $C_2H_5$ | $C_2H_5$ | $C_3H_7$ | H |
| 37 | $C_2H_5$ | $C_2H_5$ | $C_4H_9$ | $CH_3$ |
| 38 | $C_2H_5$ | $C_4H_9$ | $C_6H_5$ | $CH_3$ |
| 39 | $C_2H_5$ | $C_2H_5$ | $-C_6H_4-CH_3$ | $CH_3$ |
| 40 | $C_2H_5$ | $C_4H_9$ | $-C_6H_4-C_2H_5$ | H |
| 41 | $C_2H_5$ | $C_2H_5$ | $-C_6H_4-C_3H_7$ | $CH_3$ |

By following the procedures of examples 7 and 8, the compounds of formula Ia, listed above, can be converted into the various 4-ethoxy compounds of formula Ib or the 4-hydrazino compounds of formula Ic or the 4-hydrazone compounds of formula Id.

EXAMPLES 42-50

Following the procedure of example 2a but substituting the amine shown in column A for the ethylamine results in the production of the compounds of column B.

Column A

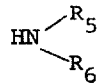

Column B

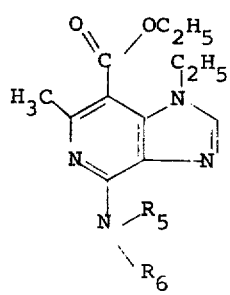

| Example | $R_5$ | $R_6$ |
|---|---|---|
| 42 | H | $CH_3$ |
| 43 | H | $C_3H_7$ |
| 44 | $CH_3$ | $CH_3$ |
| 45 | $C_2H_5$ | $C_2H_5$ |
| 46 | $CH_3$ | $C_2H_5$ |
| 47 | $C_3H_7$ | $C_3H_7$ |
| 48 | $C_4H_9$ | $C_4H_9$ |
| 49 | $CH_3$ | $C_3H_7$ |
| 50 | $C_2H_5$ | $C_3H_7$ |

EXAMPLES 51-62

Following the procedure of example 8a but substituting the hydrazines shown in column A for the hydrazine hydrate results in the production of the compounds of column B.

Column A        Column B

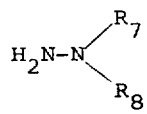　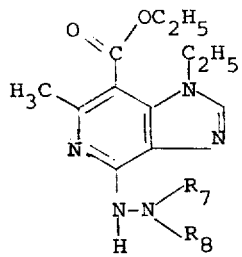

| Example | $R_7$ | $R_8$ |
|---|---|---|
| 51 | $C_2H_5$ | H |
| 52 | $C_3H_7$ | H |
| 53 | $C_4H_9$ | H |
| 54 | $C_6H_5$ (phenyl) | H |
| 55 | $C_2H_5$ | $C_2H_5$ |
| 56 | $C_3H_7$ | $C_3H_7$ |
| 57 | $CH_3$ | $C_2H_5$ |
| 58 | $CH_3$ | $C_3H_7$ |
| 59 | $CH_3$ | $C_4H_9$ |
| 60 | $CH_3$ | $C_6H_5$ |
| 61 | $C_2H_5$ | $C_6H_5$ |
| 62 | $C_6H_5$ | $C_6H_5$ |

EXAMPLE 63-75

Following the procedure of example 8b but substituting the aldehydes or ketones shown in column A for the acetone results in the production of the compounds of column B.

Column A        Column B

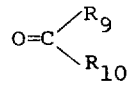　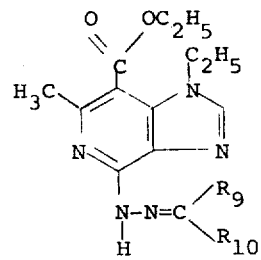

| Example | $R_9$ | $R_{10}$ |
|---|---|---|
| 63 | H | $CH_3$ |
| 64 | H | $C_2H_5$ |
| 65 | H | $C_3H_7$ |
| 66 | H | $C_4H_9$ |
| 67 | $C_2H_5$ | $C_2H_5$ |
| 68 | $CH_3$ | $C_2H_5$ |
| 69 | $CH_3$ | $C_3H_7$ |
| 70 | H | $C_6H_5$ |
| 71 | $C_6H_5$ | $C_6H_5$ |
| 72 | $CH_3$ | $C_6H_5$ |
| 73 | $C_2H_5$ | $C_6H_5$ |
| 74 | $C_3H_7$ | $C_6H_5$ |
| 75 | $C_4H_9$ | $C_6H_5$ |

EXAMPLE 76

1-Butyl-4-ethylamino-6-methyl-1H-imidazo[4,5-c]pyridine-7-carboxylic acid ethyl ester hydrochloride.

By treating the 1-butyl-4-ethylamino-6-methyl-1H- imidazo[4,5-c]pyridine-7-carboxylic acid ethyl ester of example 3 with an equivalent amount of HCl, the 1-butyl-4-(ethylamino)-6-methyl-1H-imidazo[4,5-c]pyridine-7-carboxylic acid ethyl ester hydrochloride is obtained.

EXAMPLE 77
1-Ethyl-4-hydrazino-6-methyl-imidazo[4,5-c]pyridine-7-carboxylic acid ethyl ester hydrochloride.

By treating the 1-ethyl-4-hydrazino-6-methyl-1H-imidazo-[4,5-c]pyridine-7-carboxylic acid ethyl ester of example 8a with an equivalent amount of HCl, the 1-ethyl-4-hydrazino-6-methyl-1H-imidazo[4,5-c]pyridine-7-carboxylic acid ethyl ester hydrochloride is obtained.

EXAMPLE 78
1-Ethyl-6-methyl-4-[2-(1-methyl-ethylidene)hydrazino]-1H-imidazo[4,5-c]pyridine-7-carboxylic acid ethyl ester hydrochloride.

By treating the 1-ethyl-4-[2-(1-methyl-ethylidene)-hydrazino]-1H-imidazo[4,5-c]pyridine-7-carboxylic acid ethyl ester of example 8b with an equivalent amount of HCl, the 1-ethyl-6-methyl-4-[2-(1-methyl-ethylidene)hydrazino]-1H-imidazo[4,5-c]pyridine-7-carboxylic acid ethyl ester hydrochloride is obtained.

What is claimed is:
1. A compound of the formula

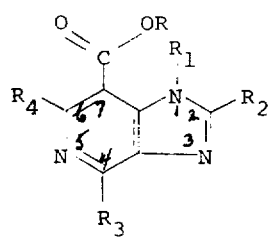

where R is selected from the group consisting of hydrogen and lower alkyl; $R_1$ is selected from the group consisting of hydrogen, lower alkyl, phenyl, phenyl-lower alkyl, and substituted phenyl and phenyl-lower alkyl wherein said phenyl substituent is selected from the group consisting of lower alkyl, lower alkoxy, halogen, $CF_3$, amino, and carboxy; $R_2$ is selected from the group consisting of hydrogen, lower alkyl, phenyl, and lower alkyl-phenyl; $R_3$ is selected from the group consisting of lower alkoxy,

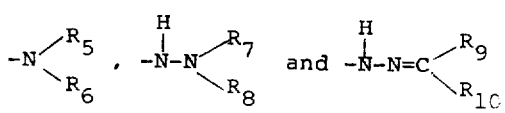

wherein $R_5$ and $R_6$ are independently selected from the group consisting of hydrogen and lower alkyl, $R_7$, $R_8$ and $R_9$ are independently selected from the group consisting of hydrogen, lower alkyl, and phenyl, and $R_{10}$ is selected from the group consisting of lower alkyl and phenyl; $R_4$ is selected from the group consisting of hydrogen, lower alkyl, and phenyl; and pharmaceutically acceptable acid addition salts thereof.

2. A compound as in claim 1 wherein R, $R_1$, $R_2$ and $R_4$ are independently selected from the group consisting of hydrogen and lower alkyl of 1 to 4 carbons; and $R_3$ is lower alkoxy of 1 to 4 carbons.

3. A compound as in claim 2 wherein R is ethyl; $R_1$ is ethyl; $R_2$ is hydrogen; $R_3$ is ethoxy; and $R_4$ is methyl.

4. A compound as in claim 1 wherein R, $R_1$, $R_2$ and $R_4$ are independently selected from the group consisting of hydrogen and lower alkyl of 1 to 4 carbons; and $R_3$ is

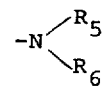

wherein $R_5$ and $R_6$ are independently selected from the group consisting of hydrogen and lower alkyl of 1 to 4 carbons.

5. A compound as in claim 4 wherein R is ethyl; $R_1$ is selected from the group consisting of ethyl and butyl; $R_2$ is selected from the group consisting of hydrogen and methyl; and $R_4$ is methyl.

6. A compound as in claim 5 wherein $R_1$ is butyl; $R_2$ is hydrogen; and $R_5$ and $R_6$ are both hydrogen.

7. A compound as in claim 5 wherein $R_1$ is butyl; $R_2$ is hydrogen; $R_5$ is hydrogen; and $R_6$ is ethyl.

8. A compound as in claim 5 wherein $R_1$ is ethyl; $R_2$ is hydrogen; $R_5$ is hydrogen; and $R_6$ is ethyl.

9. A compound as in claim 5 wherein $R_1$ is ethyl; $R_2$ is methyl; $R_5$ is hydrogen; and $R_6$ is ethyl.

10. A compound as in claim 5 wherein $R_1$ is ethyl; $R_2$ is methyl; $R_5$ is hydrogen; and $R_6$ is butyl.

11. A compound as in claim 5 wherein $R_1$ is ethyl; $R_2$ is hydrogen; $R_5$ is hydrogen; and $R_6$ is butyl.

12. A compound as in claim 1 wherein R, $R_1$, $R_2$, and $R_4$ are independently selected from the group consisting of hydrogen and lower alkyl of 1 to 4 carbons; and $R_3$ is

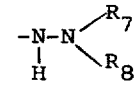

wherein $R_7$ is hydrogen and $R_8$ is selected from the group consisting of hydrogen and lower alkyl of 1 to 4 carbons.

13. A compound as in claim 12 wherein R is ethyl; $R_1$ is ethyl; $R_2$ is hydrogen; $R_4$ is methyl; and $R_7$ and $R_8$ are both hydrogen.

14. A compound as in claim 1 wherein R, $R_1$, $R_2$ and $R_4$ are independently selected from the group consisting of hydrogen and lower alkyl of 1 to 4 carbons; and $R_3$ is

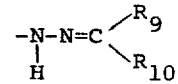

wherein $R_9$ and $R_{10}$ are each lower alkyl of 1 to 4 carbons.

15. A compound as in claim 14 wherein R is ethyl; $R_1$ is ethyl; $R_2$ is hydrogen; $R_4$ is methyl; and $R_9$ and $R_{10}$ are both methyl.

* * * * *

UNITED STATES PATENT AND TRADEMARK OFFICE
CERTIFICATE OF CORRECTION

PATENT NO. : 3,891,660
DATED : June 24, 1975
INVENTOR(S) : T. Denzel et al.

It is certified that error appears in the above-identified patent and that said Letters Patent are hereby corrected as shown below:

Col. 3, structure VIII should read as follows:

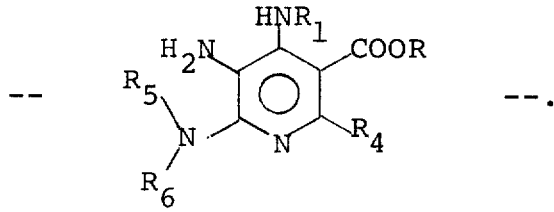

Col. 5, structure XIII should read as follows:

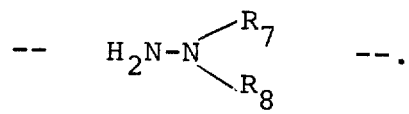

Col. 8, in the title of example 3(a), "ethylamino-12-methyl-5-nitror" should read --ethylamino-2-methyl-5-nitro--.

Col. 8, line 48, "nitropyridine" should read --nitro-pyridine--.

Col. 10, line 23, "andn" should read --and--.

Col. 10, the structure (Ia) should read as follows:

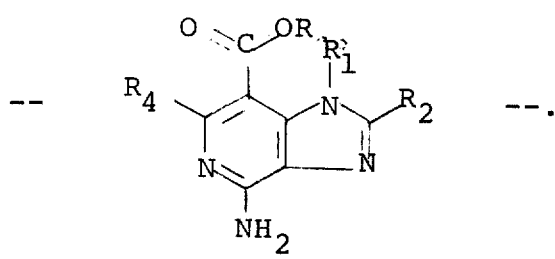

UNITED STATES PATENT AND TRADEMARK OFFICE
CERTIFICATE OF CORRECTION

PATENT NO. : 3,891,660
DATED : 6/24/75
INVENTOR(S) : T. Denzel et al.

Page 2

It is certified that error appears in the above-identified patent and that said Letters Patent are hereby corrected as shown below:

Example 12 should read across as follows:

--12    $C_4H_9$    H    $C_2H_5$    H--.

Signed and Sealed this sixteenth Day of September 1975

[SEAL]

Attest:

RUTH C. MASON
*Attesting Officer*

C. MARSHALL DANN
*Commissioner of Patents and Trademarks*